United States Patent [19]

Kithany

[11] Patent Number: 4,668,262
[45] Date of Patent: May 26, 1987

[54] PROTECTIVE COATING FOR REFRACTORY METAL SUBSTRATES

[75] Inventor: Subhash S. Kithany, Reynoldsburg, Ohio

[73] Assignee: Owens-Corning Fiberglas Corporation, Toledo, Ohio

[21] Appl. No.: 814,838

[22] Filed: Dec. 30, 1985

[51] Int. Cl.[4] .............................................. C03B 5/02
[52] U.S. Cl. ...................................... 65/1; 65/374.11; 65/DIG. 4; 219/69 E; 428/632; 428/664
[58] Field of Search ....................... 428/632, 663, 664; 219/69 E; 65/1, 374.11, DIG. 4

[56] References Cited

U.S. PATENT DOCUMENTS

| | | | |
|---|---|---|---|
| 2,777,254 | 1/1957 | Siefert et al. | 427/419.1 |
| 2,902,392 | 9/1959 | Fitzer | 428/632 |
| 3,657,784 | 4/1972 | Selman et al. | 428/632 |
| 3,783,013 | 1/1974 | Seeman | 427/318 |
| 3,853,524 | 12/1974 | Schwenninger | 65/374.11 |
| 4,017,674 | 4/1977 | Chapman | 373/124 |
| 4,095,003 | 6/1978 | Weatherly et al. | 428/632 |
| 4,208,453 | 6/1980 | Baldi | 428/632 |
| 4,366,571 | 12/1982 | Palmquist | 373/30 |
| 4,411,936 | 10/1983 | Schrewelius | 427/367 |

OTHER PUBLICATIONS

"Corning Develops a Moly-Lined Electric Melter", from Glass Industry, Jul., '84, by R. W. Palmquist.
"Two-Layer Thermal Barrier Coating for High Temperature Components", presented to American Ceramic Society, San Francisco, Calif., Nov. 1, 1976, by S. Stecura of NASA-Lewis Research Center, Cleveland, Ohio.

Primary Examiner—L. Dewayne Rutledge
Assistant Examiner—Robert L. McDowell
Attorney, Agent, or Firm—Ronald C. Hudgens; Patrick P. Pacella; Ted C. Gillespie

[57] ABSTRACT

A refractory metal substrate suitable for use in contact with molten glass is coated with a chromium oxide outer coating and a molybdenum disilicide buffer coating to protect the substrate from oxidation at elevated temperatures, particularly during start up of an electric furnace.

9 Claims, 3 Drawing Figures

PROTECTIVE COATING FOR REFRACTORY METAL SUBSTRATES

TECHNICAL FIELD

This invention relates to coatings suitable for use on refractory metal substrates. In one of its more specific aspects, this invention relates to coatings for protecting refractory metal substrates from deterioration at extremely high temperatures because of contact with the atmosphere, particularly during a start up operation.

BACKGROUND OF THE INVENTION

A common problem in operating melters or furnaces for melting mineral materials having high melting points, such as glass, is that the materials within the furnace must be capable of withstanding the effects of two different environments. First, the materials must be able to withstand the environment (i.e., exposure to air) at start up during which time the temperature will gradually increase from room temperature to a high operating temperature, perhaps as high as 3000° F. For various reasons this start up procedure can take up to seven days or more. The second environment that the apparatus experiences is that of continuous operation during which the furnace must function efficiently day in and day out at the high operating temperatures.

In order to withstand the high operating temperatures, some parts of the furnace are made from refractory metals such as molybdenum, tungsten, titanium and zirconium. These refractory metals are mechanically and physically resistant to dimensional changes under the extreme temperature conditions of an operating glass melting furnace. Electrodes and other parts of a glass melting furnace can be made from these refractory metals. A refractory metal wall can be employed to prevent contamination of the glass by deterioration of the refractory insulating brick wall.

The corrosive effects of molten glass are well known. At the high temperatures present in a glass melting furnace the glass attacks most materials, causing spalling and other forms of deterioration. Molybdenum and tungsten, however, can withstand the corrosive effects of molten glass, and titanium and zirconium can be protected from the corrosive effects of molten glass.

During start up, however, the typical refractory metal experiences an environment which causes considerable deterioration. Typically, a glass furnace is started up by heating to a molten state a small amount of glass batch in the vicinity of a few of the electrodes. The power is then slowly increased to the electrodes and gradually the temperature of the furnace, and the amount of the molten glass in the furnace is increased. During this time, the electrode is heated to its nearly operational temperature of about 3000° F., and yet is partially exposed to the air in the furnace, rather than being covered up with molten glass. This subjects the molybdenum or other refractory metal electrode, or other furnace part, to extremely rapid deterioration due to rapid oxidation.

Several methods have been developed in the prior art for avoiding deterioration of the refractory metal parts because of contact with the atmosphere. One of these is to provide either an inert gas, such as nitrogen or argon, or a reducing gas to provide a protective envelope around the reducing gas to provide a protective envelope around the electrode, the reducing gas being one such as methane or hydrogen. Another method is to try to heat the glass with temporary electrodes and/or products of combustion while keeping the operating refractory metal electrode cool during the furnace heating period. For example, a water-cooled jacket could be placed around the electrode during the time in which the molten glass is built up around the electrode. Then, when the protective water-cooled jacket is removed, the electrode will experience only molten glass, and will not be exposed to the atmosphere.

All of these methods are somewhat undesirable in that they either require extra equipment in the way of additional start up electrodes, or in that they require somewhat complicated procedures, such as the removal of the protective water-cooled jacket.

The idea of applying a protective coating to the electrode itself to ward off deterioration during start up has been tried: a protective coating of molybdenum disilicide has been employed, but has been found to provide only a few days of protection, whereas about 7 days of protection is required for furnace start up. Thus, there is a need for an improved way to protect refractory metal parts in a furnace for melting materials at high temperatures during the start up operation.

STATEMENT OF THE INVENTION

There has now been provided a way to protect refractory metal materials during high temperature start up by coating the refractory metal substrate with a fused outer coating of either chromium oxide or zirconium oxide, and a buffer coating of molybdenum disilicide intermediate the refractory metal substrate and the outer coating. The chromium oxide coating has been found to be successful in protecting the refractory metal electrode from deterioration from oxidation for as long as 7 days, which is sufficient for the start up of most glass melting furnaces. The coated refractory metal of the invention will also be useful for high-performance materials applications such as coatings on turbine blades. When used for applications not in contact with molten glass, the coating could protect the refractory metal substrate indefinitely.

According to this invention, there is provided a refractory metal substrate having a fused outer coating of $Cr_xO_y$, hereinafter generally referred to as chromium oxide, where x is greater than or equal to 1 and y is greater than or equal to 1, and a buffer coating of $MoSi_2$ intermediate the substrate and the outer coating. The substrate can be an electrode in a glass melting furnace, a refractory metal wall, or a liner in a glass melting furnace. The substrate can also be a part of a textile bushing, for the production of continuous filaments of glass, or a wool bushing.

In a preferred embodiment of the invention, the refractory metal substrate is suitable for use in contact with oxygen at a temperature greater than the oxidation acceleration temperature of the refractory metal substrate. The oxidation acceleration temperature is that temperature for each refractory metal above which the rate of oxidation is so high that rapid deterioration of the refractory metal substrate occurs, assuming the refractory metal substrate is not protected from contact with oxygen. The oxidation acceleration temperatures for refractory metal substrates which can be used according to this invention are as follows: molybdenum—about 1200° F.; tungsten—about 1200° F.; titanium—about 1000° F.; and, zirconium—about 900° F. Although these are the temperatures at which the metals will rapidly oxidize, it is understood that these temperatures are much higher than the industry-recognized safe operating temperatures for such metals. For example, at high temperatures oxygen forms the oxides $MoO_2$ and $MoO_3$ on a molybdenum substrate. Above 932° F. the $MoO_3$ begins to volatilize and at 1110° F. the rate of evaporation becomes significant. At about 1450° F. the rate of evaporation equals its rate of formation and, as the temperature increases, the volatilization becomes extremely rapid. At 1750° F., the evaporation rate is about equal to the evaporation of water in dry air at 125° F.

In a preferred embodiment of the invention, the refractory metal substrate is comprised of molybdenum.

In another preferred embodiment of the invention, the refractory metal substrate is comprised of tungsten.

In a specific embodiment of the invention, the buffer coating has a thickness within the range of from about 0.5 mil. to about 1.5 mil., and the outer coating has a thickness within the range of from about 0.5 mil. to about 25 mil. Preferably, the ratio of thicknesses of the outer coating to the buffer coating is within the range of from about 10:1 to about 50:1.

DESCRIPTION OF THE INVENTION

This invention will be described in terms of a furnace for melting glass, although it is to be understood that the invention can be practiced with other high temperature melting materials, such as rock, slag or basalt.

Figure 1:
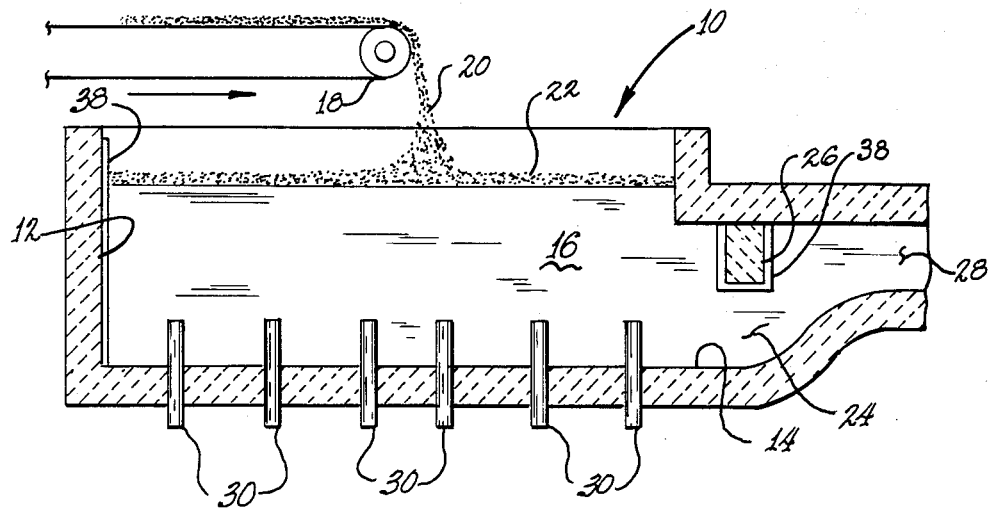
FIG. 1 is a schematic view in elevation of a glass melting furnace containing refractory metal substrate walls and electrodes coated according to the invention.

As shown in FIG. 1, furnace 10 is comprised of furnace side walls 12 and furnace bottom wall 14, which can be comprised of refractory blocks of any suitable refractory materials, such as zirconium silicate. A body of molten glass 16 is contained in the furnace. Batch feeder 18 is positioned to deposit batch 20 onto the top of the molten glass into form of batch blanket 22, which serves to insulate the molten glass from the atmosphere. The molten glass exits from the furnace through throat 24 which is defined by skimmer block 26, and then passes through channel 28 to any suitable receptacle for the molten glass, such as a forehearth supplying bushings for the production of glass fibers, not shown.

The glass is kept in a molten state, and the batch in the blanket is melted, by the heat supplied from Joule effect heating from the electric current passing between electrodes 30. The electrodes can be inserted through the furnace bottom wall, as shown, and/or can be positioned in the furnace side walls.

Figure 2:
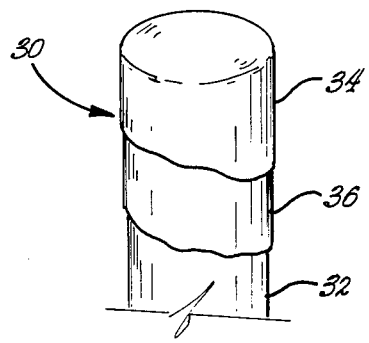
FIG. 2 is a schematic cut-away view of an electrode showing the buffer coat and chromium oxide overcoat.

As shown in FIG. 2, the electrode can be made of any refractory metal, such as molybdenum substrate 32. The substrate of the invention is coated with outer coating 34 of chromium oxide or a variation thereof. Numerous forms of chromium oxide can be employed, with the general formula given as $Cr_xO_y$, where x is greater than or equal to 1 and y is greater than or equal to 1. For example, chromium dioxide, $CrO_2$, can be employed. The preferred form of chromium oxide is $Cr_2O_3$. Other forms can also be used. Preferably, the outer coating of chromium oxide is applied to a thickness within the range of from about 0.5 mil. to about 25 mil., and most preferably a thickness of approximately 15 mil. The chromium oxide coating can be applied by any suitable technique, such as the plasma fusion technique known to those skilled in the art, which applies coatings at temperatures as high as 15,000° to 50,000° F.

Buffer coat 36 of molybdenum disilicide is placed on the molybdenum substrate intermediate the substrate and the chromium oxide overcoat. The buffer coat acts as a coupling agent and adds adhesion properties to enable the outer coating to adhere to the molybdenum substrate. The buffer coat may also act to accommodate differences in the coefficient of thermal expansion between the outer coating and the substrate. The buffer coat of molybdenum disilicide can be applied to the substrate using the cementation technique known to those skilled in the art. The cementation technique employs a diffusion process in which the silicon is diffused into the molybdenum. It is to be understood that the molybdenum disilicide coating will actually be a gradient of concentration of molybdenum and silicon from the outside of the buffer coating to the inside of the buffer coating (i.e., next to the molybdenum substrate). For example, the coating next to the substrate will have a high concentration of $Mo_3Si$, with the next outer layer being predominantly $Mo_3Si_2$, followed by the outermost layer of $MoSi_2$.

During operation, the coating of this invention may wear out once the electrode is exposed to glass for longer than about 7 to 14 days, thereby exposing the buffer coat and/or the molybdenum substrate. Since the molybdenum substrate is immersed in the molten glass, subsequent corrosion of the electrode by oxidation is minimal.

The furnace side walls and bottom wall are normally made of refractory materials, such as alumina, beryllia or zirconia. The refractory blocks of the side walls and bottom wall of the furnace can be coated with the coating of the invention ($MoSi_2$ buffer coat and $Cr_xO_y$ outer coating) or fitted with liner 38 of refractory metal coated with the coating of the invention. In addition to the sidewalls and bottom wall of the furnace, the liner can be fitted to other exposed parts of glass melting equipment such as the forehearth, the throat, skimmer block and channel. These parts will be protected from deterioration at elevated temperatures during start up when they are exposed to the atmosphere.

In an additional aspect of the invention, the outer coating can comprise zirconium oxide. As is known in the art, such a coating is commonly stabilized with yttrium. The coating can be applied in the usual manner with the plasma torch.

Figure 3:
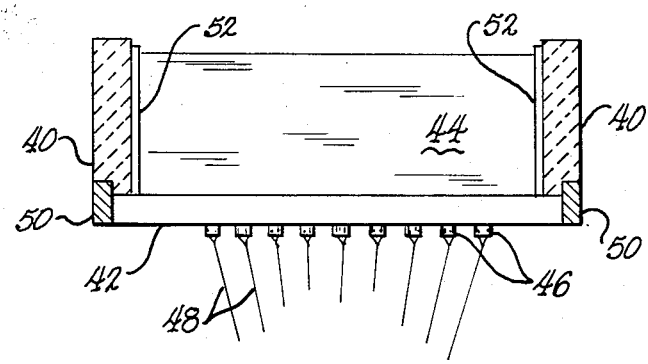
FIG. 3 is a schematic view in elevation of a textile bushing for the manufacture of glass fibers according to the principles of the invention.

As shown in FIG. 3, the coated refractory metal substrate can be employed in a textile bushing for producing glass fibers. The textile bushing is comprised of refractory material walls 40 and bushing bottom wall 42 which contains body of molten glass 44. The bushing bottom wall is adapted with a plurality of tips 46 through which molten glass passes to form glass fibers 48. The bushing bottom wall can be electrically heated by the application of an appropriate voltage across terminals 50. The invention can be applied to the textile bushing in two ways. First, the bushing bottom wall can be comprised of a refractory metal substrate coated with the coating of the invention. Second, the refractory walls (or bushing bottom wall) can be adapted with a liner, such as liner 52, to protect the body of molten glass from contamination caused by deterioration of the refractory material.

EXAMPLE

Samples of various electrodes 8 inches in length and ½ inch in diameter were maintained in crucibles in a furnace, exposed to air and glass, at a temperature of 2300° F. for a period of time. The crucibles were filled with AF batch cullet to the top. When the crucibles were topped off with the cullet, about ½ inch of each test piece length was still protruding from the crucibles. The crucibles were then lowered in a top loading laboratory furnace. The top of the furnace was covered, with the top cover removed for observation about 2 times a day, for 7 days. The 5 samples were as follows:

M-1—base alloy molybdenum, first coat moly disilicide, second coat chromium oxide.

M-2—base alloy molybdenum, first coat moly disilicide, second coat yttrium stabilized zirconia.

M-3—base alloy molybdenum, first coat Fe-24Cr-8Az-0.5Y.

M-4—base alloy molybdenum, first coat Fe-24Cr-8Az-0.5Y, second coat chromium oxide.

M-5—base alloy molybdenum, first coat 50% Fe-24Cr-8Az-0.5Y, 50% chromium oxide, second coat yttrium stabilized zirconia.

Of the 5 samples tested, the test piece M-1, which is a coating of $Cr_2O_3$ over molydisilicide survived 7 days with no visible signs of corrosion. Samples M-3, M-4, and M-5 started deteriorating from day 1. Sample M-2 broke at the glass line after 2 days.

From the above results, it can be seen that the coating of the invention provides effective protection from oxidation during conditions similar to those of starting up an electric furnace.

I claim:

1. A refractory metal substrate suitable for use in contact with oxygen at 2300° F. where said substrate has a fused outer coating of $Cr_xO_y$, where $x \geq 1$ and $Y \geq 1$, and a buffer coating of $MoSi_2$ intermediate said substrate and said outer coating.

2. The refractory metal substrate of claim 1 in which said refractory metal is molybdenum.

3. The refractory metal substrate of claim 1 in which said refractory metal is tungsten.

4. The substrate of claim 2 in which said buffer coating has a thickness within the range of from about 0.5 mil. to about 1.5 mil., and said outer coating has a thickness within the range of from about 0.5 mil. to about 25 mil.

5. The substrate of claim 2 in which the ratio of thicknesses of said outer coating to said buffer coating is within the range of from about 10:1 to about 50:1.

6. A refractory metal substrate suitable for use in contact with oxygen at 2300° F. where the substrate has a fused outer coating of $ZrO_2$, and a buffer coating of $MoSi_2$ intermediate said substrate and said outer coating.

7. An electrode for a glass melting furnace, the electrode being suitable for use in contact with oxygen at 2300° F., and comprising a molybdenum substrate, a fused outer coating of $Cr_xO_y$, where $x \geq 1$ and $y \geq 1$ and a buffer coating of $MoSi_2$ intermediate said molybdenum substrate and said outer coating.

8. A liner in a glass melting furnace, the liner being suitable for use in contact with oxygen at 2300° F., and comprising a molybdenum substrate, a fused outer coating of $Cr_xO_y$, where $x \geq 1$ and $y \geq 1$, and a buffer coating of $MoSi_2$ intermediate said molybdenum substrate and said outer coating.

9. A textile bushing for making glass fibers, the bushing being suitable for use in contact with oxygen at 2300° F., and comprising a molybdenum substrate, a fused outer coating of $Cr_xO_y$, where $x \geq 1$ and $y \geq 1$, and a buffer coating of $MoSi_2$ intermediate said molybdenum substrate and said outer coating.

* * * * *